United States Patent
Kuchler

(10) Patent No.: US 7,331,162 B2
(45) Date of Patent: Feb. 19, 2008

(54) PACKAGE SEALER FOR SLICING MACHINE

(76) Inventor: Fritz Kuchler, Klatteweg 4-6, A-9020 Klagenfurt (AT)

(*) Notice: Subject to any disclaimer, the term of this patent is extended or adjusted under 35 U.S.C. 154(b) by 72 days.

(21) Appl. No.: 11/079,514

(22) Filed: Mar. 7, 2005

(65) Prior Publication Data

US 2005/0193685 A1   Sep. 8, 2005

(30) Foreign Application Priority Data

Mar. 5, 2004   (AT) ............................... A 384/2004

(51) Int. Cl.
*B65B 63/00* (2006.01)
*B65B 1/32* (2006.01)
*B65B 41/00* (2006.01)
*B65B 53/00* (2006.01)
*A21C 15/04* (2006.01)

(52) U.S. Cl. ................ 53/435; 53/389.3; 53/502; 53/514

(58) Field of Classification Search .............. 53/514, 53/517–518, 540, 206, 556, 389.1–389.4, 53/435, 58, 502, 503; 83/77, 88, 153, 167, 83/155.1

See application file for complete search history.

(56) References Cited

U.S. PATENT DOCUMENTS

| 3,634,993 A | * | 1/1972 | Pasco et al. .................. 53/433 |
| 3,648,429 A | * | 3/1972 | Davidson et al. ............. 53/77 |
| 5,155,969 A | * | 10/1992 | Kuethe .......................... 53/86 |
| 6,666,006 B2 | * | 12/2003 | Kuchler ....................... 53/514 |

* cited by examiner

*Primary Examiner*—Rinaldi I. Rada
*Assistant Examiner*—John Paradiso
(74) *Attorney, Agent, or Firm*—Andrew Wilford

(57) ABSTRACT

A slicing machine has a deposition surface adapted to support a fusible bottom sheet. Slices are cut from a foodstuff and deposited as a stack on the bottom sheet on the surface between edges of the surface so that a fusible top sheet can be placed atop the stack. Respective bars at the surface edges have bar edges and are each pivotal between a working position projecting over the surface with the bar edges aligned vertically with the respective surface edges and rest positions retracted from above the sheet on the surface. Actuators can pivot the bars from their rest positions into their working positions. Heaters are provided in at least some of the edges. In the working positions the sheet edges are pinched between the bar edges and the heated surface to bond the edges together.

12 Claims, 3 Drawing Sheets

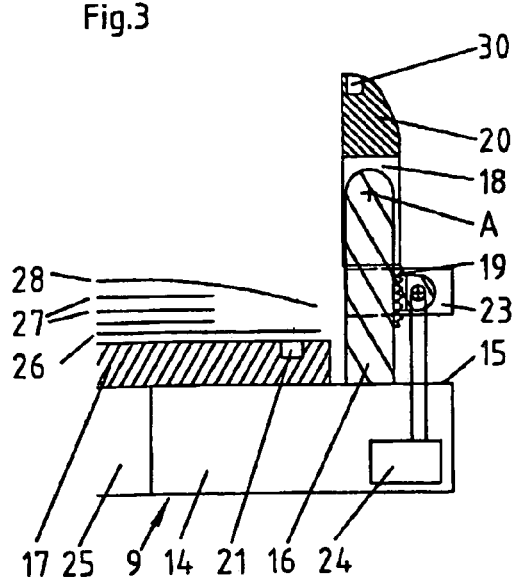
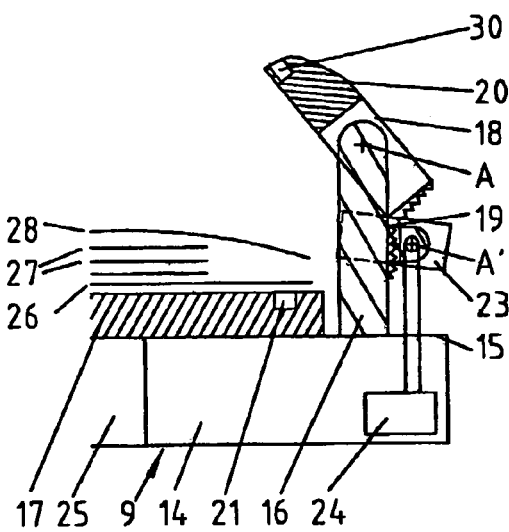
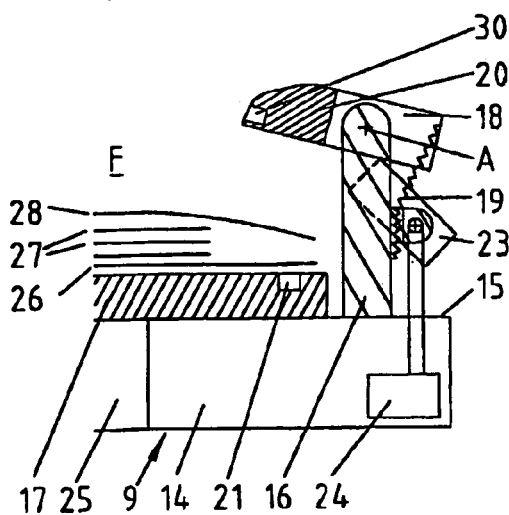
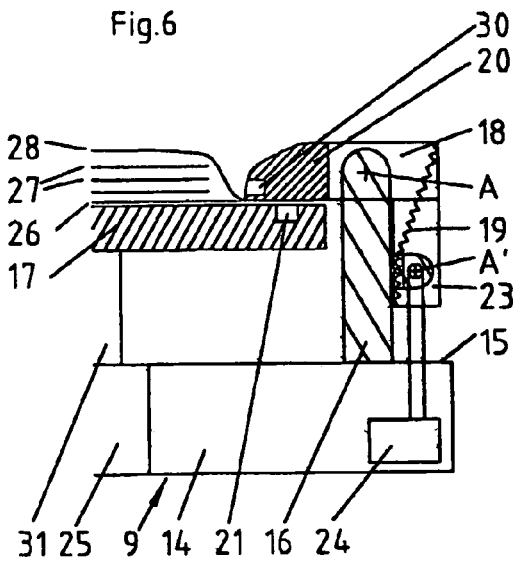

PACKAGE SEALER FOR SLICING MACHINE

FIELD OF THE INVENTION

The present invention relates to a package sealing unit. More particularly this invention concerns a sealer for use on a slicing machine.

BACKGROUND OF THE INVENTION

A standard slicing machine such as described in U.S. Pat. No. 6,666,006 has a main housing having a horizontal conveyor surface and a subassembly in the main housing for cutting slices from a foodstuff and depositing them on the conveyor surface. A supply housing immediately upstream of the main housing carries a supply roll of flexible strip and mechanism for feeding the flexible strip downstream toward the main housing. A cutter on the supply housing can sever a sheet from a leading end of the flexible strip. A gripper above the surface is displaceable between an upstream position generally at the cutter and a downstream position downstream of the surface. The gripper is closable to grip the leading end of the flexible strip and openable to release it. A controller connected to the gripper, to the cutter, and to the supply periodically displaces the gripper between its upstream and downstream positions so as to pull the strip downstream above the surface, operates the cutter to sever a sheet from the downstream strip end generally when the gripper reaches its downstream position, and opens the gripper in the downstream position to drop the sheet severed from the strip down onto the surface.

This sealer further has a short conveyor forming an extension of the conveyor surface of the main housing, an upper heated annular die above the short conveyor, and an actuator controlled by the controller for raising the short conveyor and a slice stack thereon up into engagement with the die to fuse sheets underneath and on top of the stack together. Thus the system has on a separate housing, which also never directly contacts the foodstuff being packaged, all the parts for sealing the package made up on the middle main housing.

Such an arrangement is convenient in that it can produce a hermetically sealed package of freshly cut slices. Thus the machine operator can custom cut cheese, cold cuts, and the like and produce a very neat sealed package for the consumer right under the consumer's eyes.

The difficulty with this arrangement is that it is very bulky. It is horizontally rather long and complex, taking up valuable room at the work counter.

OBJECTS OF THE INVENTION

It is therefore an object of the present invention to provide an improved package sealer for a slicing machine.

Another object is the provision of such an improved package sealer for a slicing machine that overcomes the above-given disadvantages, in particular that is quite compact, yet just as easy to use and clean as the prior-art systems.

A further object is to provide an improved method of operating a slicing machine and making a package therewith.

SUMMARY OF THE INVENTION

A slicing machine has according to the invention a housing having a deposition surface adapted to support a fusible bottom sheet and having a plurality of edges. Slices are cut from a foodstuff and deposited as a stack on the bottom sheet on the surface between the surface edges so that a fusible top sheet can be placed atop the stack. According to the invention respective bars at the surface edges have bar edges and are each pivotal about a respective axis between a working position projecting over the surface with the bar edges aligned vertically with the respective surface edges and rest positions retracted from above the sheet on the surface. Actuators can pivot the bars from their rest positions into their working positions. Heaters are provided in at least some of the edges.

In one system according to the invention, a drive relatively vertically displaces the bars and the surface in the working positions of the bars for pressing and bonding together edges of the sheets with the slices between them. In another system the pivot axes for the bars are so low that in the working positions their ends press the sheet edges together for bonding.

The packaging method of this invention therefore comprises the steps of sequentially cutting a plurality of slices of a foodstuff and depositing them on a fusible bottom sheet lying on a deposition surface. Then a fusible top sheet is set atop the slices on the bottom sheet with edges of the top sheet generally aligned above respective edges of the bottom sheet and the slices between the sheets. A bar at each of the edges is thereafter shifted pivotally from a rest position retracted backward from above the slices and sheets on the surface to a position with a bar edge overhanging the surface and aligned above a respective edge of the sheets on the surface. If necessary, the surface and bar are then vertically displaced toward each other to compress the sheet edges between the respective bars and the surface while heating the sheet edges to fuse the sheet edges together. Thereafter the bars are vertically displaced back into the rest positions and the surface and bar are vertically displaced away from each other. The sheets and the slices between them are then from the deposition surface. Of course in the system with the low pivots for the bars, no such relative vertical displacement of the bars and surface is necessary.

Thus with this system the sealer is a very compact device that frames the deposition area and that does not add to the footprint of the slicing machine. When the sealing bars are pivoted into their rest positions, they leave the field where the slices are deposited completely free for the machine operator to set down the bottom sheet, for the slicing machine to make the stack or array, and for the operator to place the top sheet in place, whereupon the sealer automatically bonds together the edges of the top and bottom sheets. The sealer has a very short vertical dimension so that it fits easily between the deposition plate and the chain arrangement normally used to move and array the slices as they are cut.

According to the invention respective latch elements between the bars and the actuators block the bars in the working positions during relative vertical displacement of the bars and the surface. The latch elements are pivotal about axes parallel to the axes of the respective bars. In the working positions, ends of element, which themselves are formed as short bars, bear radially of the respective element axes directly against the sealing bars so that backward pivoting of the sealing bars into the rest positions is resisted solidly.

A vertically shiftable deposition plate is connected in accordance with the invention to the drive and forms the surface. The heaters are in the deposition plate, each extending in a straight line along the edge of the deposition plate to define a rectangular deposition field. This makes it possible to keep the supply cable for these normally electrical heaters safely out of the way. It is of course also possible to hold the deposition plate stationary and lower a frame carrying the sealing bars.

Sensors are connected to a controller of the drive and actuator for preventing relative vertical displacement of the bars and surface when something other than the slices and sheets are adjacent the surface between the bars. Thus if the machine operator's hand is in the way, there will be no possibility of clamping his or her fingers.

To ease removal of the finished package from atop the deposition surface, a push-out element can be displaced upward against the bottom sheet to raise it and any slices on it off the surface.

The entire deposition plate can be coupled to the arraying system of the slicing machine so as to horizontally shift the surface and thereby array the slices deposited on it.

BRIEF DESCRIPTION OF THE DRAWING

The above and other objects, features, and advantages will become more readily apparent from the following description, reference being made to the accompanying drawing in which:

FIGS. 3 to 6 are schematic large-scale end views corresponding to section plane III-III of FIG. 2 and illustrating operation of the sealer in accordance with the invention.

SPECIFIC DESCRIPTION

Figure 1:
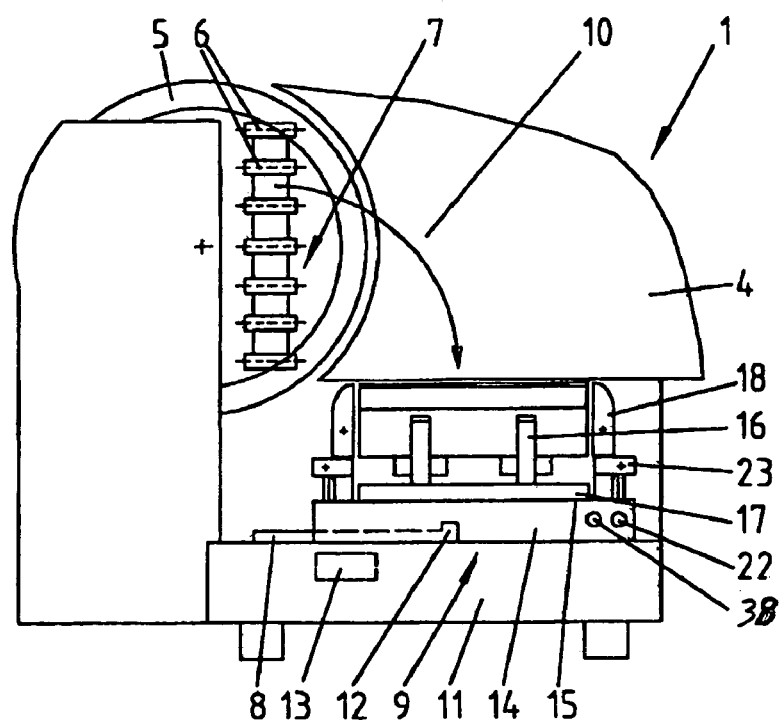
FIG. 1 is a partly diagrammatic side view of a slicing machine with the sealer according to the invention.
Figure 2:
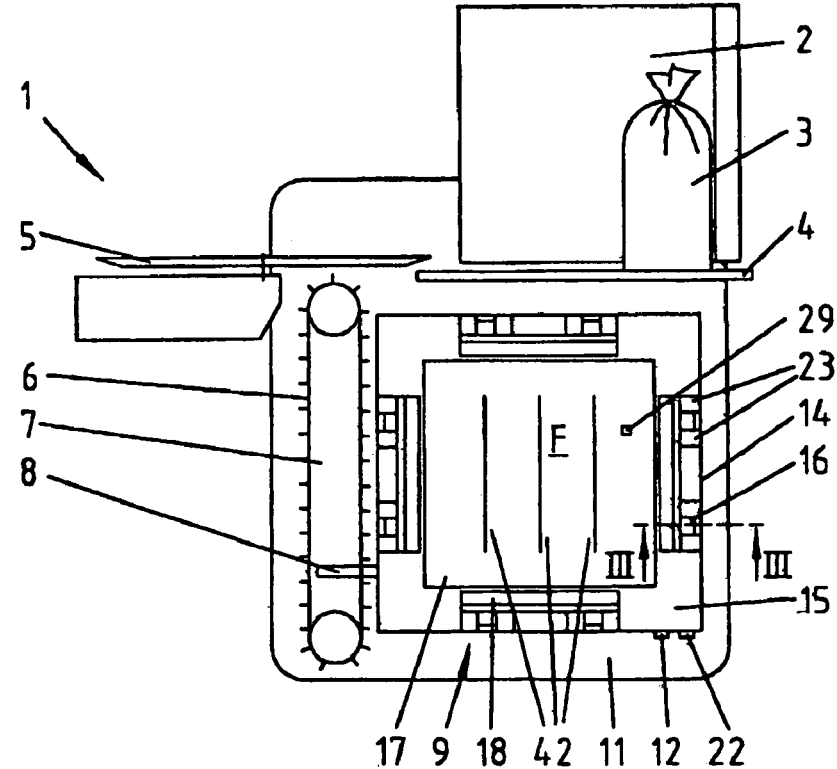
FIG. 2 is a top view of the machine of FIG. 1.

As seen in FIGS. 1 and 2, a slicing machine 1 according to the invention has a housing 11 that carries a slide or carriage 2 adapted to hold a foodstuff 3, here a wurst, which is pressed against a stationary abutment plate 4 and moved past a standard circularly planar blade 5 to cut slices 27 (FIGS. 3-8) from it. Point-carrying feeder chains 6 orbiting on a frame 7 moved by a controller 13 deposit the slices 27 as shown by arrow 10 on a horizontal deposition plate or surface 17 of a sealer 9 that has ribs 42 and that is moved about via an entrapment lug 12 of a conveyor element 8 by the controller 13, the slices 27 being dropped as is well known in the art into an array which may be a simple stack or extended in some pattern depending on how the controller 13 moves the lug 12. The controller 12 has a timer switch 38 allowing the fuse time to be adjusted, it normally being set between 1.5 sec and 3.0 sec.

According to the invention as shown in FIGS. 3 to 6 the sealer 9 is basically formed as a rectangular frame 14 having an upper wall or plate 15 on which the deposition plate 17 is mounted and that is moved by the lug 12 of the conveyor element 8. The square deposition plate 17 carries four identical bars 18 arrayed as the sides of a rectangle around its sides, with the bars 18 defining a rectangular deposition field F. Each bar 18 is supported on the upper plate 15 by a pair of posts 16 for pivoting about a respective horizontal axis A between an upper rest or starting position shown in FIG. 3 and a lower working position shown in FIG. 6, with the axes A framing the field F. In the working positions, outer edges 20 of the bars 18 project into the field F and are positioned above heater bars 21 extending along the respective outer edges of the plate 17.

Motion-detecting sensors 30 connected to the controller 13 are provided on the edges 20 of the bars 18 and serve, as described below, to detect the presence of something above the plate 17 in the field F in the lower (FIG. 6) positions of the bars 18. In addition, the bars 18 are urged into their upper rest positions by respective tension coil springs 19. They can be pivoted from their upper end positions (FIG. 3) into their lower end positions (FIG. 6) by actuating members 23 that themselves are pivotal about respective axes A' by respective motors 24 operated by the controller 13 to move the bars 18 synchronously. In their lower working positions, the actuating members 23 solidly brace the respective bars 18 so their outer ends 20 cannot pivot upward about the axes A. In this embodiment, the deposition plate 17 can be raised and lowered by an actuator 25 having a piston rod 31.

Figure 7:
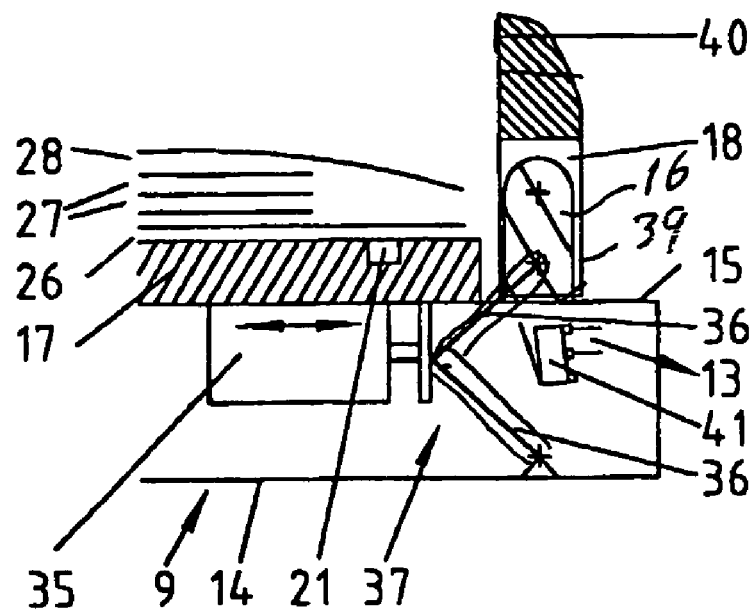
FIGS. 7 and 8 are partly schematic and sectional views illustrating another embodiment of the instant invention.
Figure 8:
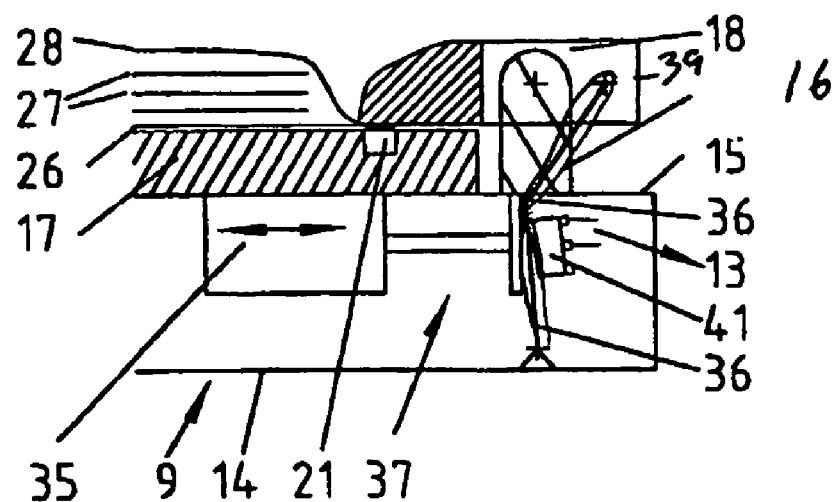

The arrangement of FIGS. 7 and 8 is similar, but instead of the plate 17 being vertically shiftable, the posts 16 are shorter and the axes A of the bars 18 are hence somewhat lower so that, when the bars 18 are pivoted downward, silicone pusher strips 40 on their outer ends 20 bear downward on the upper surface of the plate 17 or anything sitting thereon. Here ends 39 of the bars 18 to the opposite sides of the respective axes A as the ends 20 are each connected to a respective pair of levers forming a knee-lever assembly 36 operated by a respective solenoid actuator 35. A switch 41 connected to the controller 12 reports when the down end position of the respective bars 18 has been reached.

The systems described above are operated as follows:

To start with the machine operator lays a fusible bottom sheet or foil 26 directly on the deposition plate 17. Then the slicer 1 is run in the standard manner to deposit a pile of the foodstuff slices 27 atop this bottom foil 26, the array or pile being oriented such that the bottom foil 26 sticks out all around it. Separating sheets can be set between groups of slices to segregate the stack if desired.

Once the desired number or weight of slices 27 has been deposited, a top foil or sheet 28 of the same fusible plastic, size, and shape as the bottom sheet 26 is laid atop the stack of slices 27. The outer edges of the top sheet 28 are aligned above those of the bottom sheet 26 and, like them, project out past the stack of slices 27.

In the embodiment of FIGS. 1-6, the motors 24 are then started by actuation of a button 22 either on the sealer frame 14 or on the machine housing 11, unless the sensors 30 on the arms 18 detect the operator's hand or something else is in the field F and prevent such action until the field F is clear. The motors 24 thus pivot all the bars 18 from their FIG. 3 position through the positions of FIGS. 4 and 5 to the FIG. 6 position, whereupon the controller 13 automatically operates the actuator 25 to raise the plate 17 with the foils 26 and 28 and slices 27 so as to press the outer edges of the foils 26 and 28 between the edges 20 of the bars 18 and the outer edges of the plate 17 where the heater elements 21 are. The blocking of the bars 18 by the members 23 allows the plate 17 to push up against them with considerable force, e.g. 30 kg, to ensure good contact between the outer edges of the foils 26 and 28. The heat from the heater elements 21 fuses the pressed-together edges of the two foils 26 and 28 together for the time preset at control 38.

Once the edges of the foils 26 and 28 have been sealed together, the actuator 25 is relaxed to drop down the plate 17 and the drives 24 are reversed to raise the bars 18 back to their FIG. 3 rest position. At the same time a push-out rod 29 (FIG. 2 only) can be raised to lift a corner of the thus formed package, 26, 27, 28 and make it easy for the operator to pick it out of the sealer 9.

In the embodiment of FIGS. 7 and 8, once the stack is formed and the top sheet 28 has been set in place, the solenoids 35 act through the respective knee-lever assemblies 36 to pivot down the respective bars 18 and press the foil edges together between the pusher strips 40 and the heaters 21 of the nonraisable plate 17. After the preset time the solenoids 35 release and the bars 18 pivot back up, clearing the field F and allowing the finished package to be taken away.

The bars 18 here do not meet at the corners so the package can breathe somewhat. If desired they can be mitered to meet snugly at the corners and form an all-around annular seal.

I claim:

1. A method of packaging a foodstuff, the method comprising the steps of sequentially:
   a) horizontally shifting a plurality of bars above edges of a deposition surface into rest positions with the bars wholly retracted from above the deposition surface and thereafter cutting a plurality of slices of a foodstuff and depositing them on a fusible bottom sheet lying on the deposition surface;
   b) while maintaining the bars in the rest positions, setting a fusible top sheet down atop the slices on the bottom sheet with edges of the top sheet generally aligned above respective edges of the bottom sheet and the slices between the sheets;
   c) without horizontally displacing the stack and sheets, displacing the bars from the rest positions to work positions with edges of the bars moving horizontally so that they overhang the surface and are vertically aligned above respective edges of the sheets on the surface;
   c') vertically displacing the surface and bars toward each other in the work positions of the bars to compress the sheet edges between the respective bar edges and the surface edges while heating the sheet edges to fuse the sheet edges together; and
   c") vertically displacing the surface and bars away from each other; and
   d) removing the sheets and the slices between them from the deposition surface.

2. The method defined in claim 1 wherein in the working positions the bar edges press the sheet edges against the surface. surface.

3. A slicing machine comprising:
   a housing having a deposition surface adapted to support a fusible bottom sheet and having a plurality of edges;
   means in the housing for cutting slices from a foodstuff and depositing them from above as a stack on the bottom sheet on the surface between the surface edges so that a fusible top sheet can be placed atop the stack;
   a respective bars at the surface edges having bar edges and each pivotal about a respective axis for shifting at least the bar edges generally horizontally between a working position projecting over the surface with the bar edges aligned vertically above the respective surface edges, and rest positions with the bar edges retracted horizontally from above the sheet on the surface and providing clearance above the surface such that, in the working positions edges of the sheets with the slices between them can be pressed and bonded together between the bar edges and the surface edges and in the rest positions the bars do not interfere with the cutting and depositing means;
   actuator means for pivoting the bars from their rest positions into their working positions after the stack has been formed by the depositing means and a fusible top sheet has been placed atop the stack;
   drive means for relatively vertically shifting the surface and the bars in the working positions of the bars to pinch outer edges of the top and bottom sheets between the bar edges and the respective surface edges; and
   heaters in at least some of the edges.

4. The slicing machine defined in claim 3 wherein the bar axes are positioned such that when the bars are in their working positions their edges are very closely juxtaposed with the work surface, whereby edges of the sheets with the slices between them are pinched between the bar edges and the surface in the working positions of the bars.

5. The slicing machine defined in claim 3, further comprising
   respective latch elements between the bars and the actuator means for blocking the bars in the working positions during relative vertical displacement of the bars and the surface.

6. The slicing machine defined in claim 5 wherein the latch elements are pivotal about axes parallel to the axes of the respective bars.

7. The slicing machine defined in claim 3, further comprising
   a vertically shiftable deposition plate connected to the drive means and forming the surface.

8. The slicing machine defined in claim 7 wherein the heaters are in the deposition plate.

9. The slicing machine defined in claim 3, further comprising
   means connected to the drive means and including sensors for preventing operating of the drive means and relative vertical displacement of the bars and surface when something other than the slices and sheets is adjacent the surface between the bars.

10. The slicing machine defined in claim 3, further comprising
    a push-out element displaceable upward with the bottom sheet to raise it and any slices on it off the surface.

11. The slicing machine defined in claim 3, further comprising
    means for horizontally shifting the surface and thereby arraying the slices deposited on it.

12. The slicing machine defined in claim 3, further comprising
    respective springs urging the bars into the rest positions.

* * * * *